United States Patent
Sakai et al.

(10) Patent No.: US 10,948,961 B2
(45) Date of Patent: Mar. 16, 2021

(54) ELECTRONIC DEVICE, METHOD AND COMPUTER-READABLE MEDIUM

(71) Applicant: Brother Kogyo Kabushiki Kaisha, Nagoya (JP)

(72) Inventors: Katsunori Sakai, Toyokawa (JP); Mitsuru Nakamura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 106 days.

(21) Appl. No.: 15/939,453

(22) Filed: Mar. 29, 2018

(65) Prior Publication Data

US 2018/0284861 A1  Oct. 4, 2018

(30) Foreign Application Priority Data

Mar. 31, 2017 (JP) .............................. JP2017-073322

(51) Int. Cl.
*G06F 1/26* (2006.01)
*G06F 1/3234* (2019.01)
*H04N 1/00* (2006.01)

(52) U.S. Cl.
CPC .............. *G06F 1/266* (2013.01); *G06F 1/325* (2013.01); *H04N 1/00885* (2013.01); *H04N 2201/0048* (2013.01); *H04N 2201/0094* (2013.01)

(58) Field of Classification Search
CPC ..................................................... G06F 1/266
See application file for complete search history.

(56) References Cited

U.S. PATENT DOCUMENTS 9,692,923 B2   6/2017 Achiwa et al.
2002/0038432 A1*  3/2002 Hsu .......................... G06F 1/266
                                                     713/300

(Continued)

FOREIGN PATENT DOCUMENTS

JP   2008-165533 A    7/2008
JP   2014-217242 A   11/2014

(Continued)

OTHER PUBLICATIONS

Jan. 26, 2021—(JP) Notice of Reasons for Refusal—App 2017-073322, Eng Tran.

*Primary Examiner* — Kim Huynh
*Assistant Examiner* — Joshua Neveln
(74) *Attorney, Agent, or Firm* — Banner & Witcoff, Ltd.

(57) ABSTRACT

An electronic device, including a power source, power-consuming devices, a USB interface, a command receiver, a memory, and a controller, is provided. The controller forecasts at least one of the power-consuming devices to be used in one of a plurality of time segments, calculates a level of total operation power being sum of power required by the forecasted at least one of the power-consuming devices for the time segment with reference to values of power stored in the memory, and determine a level of the power to be delivered to an external device connected to the USB interface in the time segment based on the level of the total operation power and the level of the power capacity in the power source. The controller controls the power source to deliver the determined level of the power to the external device through the USB interface during the time segment.

22 Claims, 8 Drawing Sheets

(56) References Cited

U.S. PATENT DOCUMENTS

| | | | |
|---|---|---|---|
| 2006/0117195 A1* | 6/2006 | Niwa | G06F 1/266 |
| | | | 713/300 |
| 2006/0179335 A1 | 8/2006 | Jang | |
| 2008/0162955 A1 | 7/2008 | Shimizu | |
| 2015/0198989 A1* | 7/2015 | Hayter | G06F 1/263 |
| | | | 713/340 |
| 2015/0264208 A1* | 9/2015 | Achiwa | H04N 1/00885 |
| | | | 358/1.15 |
| 2017/0017283 A1 | 1/2017 | Seo | |
| 2018/0267447 A1* | 9/2018 | Kato | G03G 15/2039 |

FOREIGN PATENT DOCUMENTS

| | | |
|---|---|---|
| JP | 2015-088036 A | 5/2015 |
| JP | 2015-174375 A | 10/2015 |
| JP | 2015-174377 A | 10/2015 |
| JP | 2015-176442 A | 10/2015 |

\* cited by examiner

| Power-Consuming Device | Condition 1 | Condition 2 | Condition 3 |
|---|---|---|---|
| Motor A | 60 | 65 | 80 |
| Motor B | 10 | 20 | 40 |
| Solenoid | 15 | 15 | 15 |
| Fan | 0.5 | 0.5 | 0.5 |
| CPU, etc. | 2 | 2 | 2 |

ELECTRONIC DEVICE, METHOD AND COMPUTER-READABLE MEDIUM

CROSS REFERENCE TO RELATED APPLICATION

This application claims priority from Japanese Patent Application No. 2017-073322, filed on Mar. 31, 2017, the entire subject matter of which is incorporated herein by reference.

BACKGROUND

Technical Field

An aspect of the present disclosure is related to an electronic device.

Related Art

An electronic device, such as a multifunction peripheral (MFP), may often be equipped with a universal serial bus (USB) interface to connect with an external device.

Through the USB interface, not only data is exchangeable between the connected devices, but also power is deliverable from one to the other of the connected devices. Moreover, a USB interface in compliance with USB Power Delivery (USB PD) standard established lately enables power delivery of as much as 100 W to the external device through the USB interface.

Meanwhile, capacity of power in a power circuit in the electronic device may be limited; therefore, the electronic device may need to manage distribution of the power, including power to be used in an operation in the electronic device, such as a printing operation, and power to be delivered to the external device, within the limited power capacity. In this regard, the electronic device may have a memory to store power-consumption information concerning power to be consumed by the electronic device for each assumable power condition and power-capacity information concerning power capacity of the electronic device. When a power condition in the electronic device changes, e.g., when the electronic device starts an operation, the electronic device may create deliverable-power information concerning deliverable capacity of power to the external device and change a level of the power to be delivered to the external device.

SUMMARY

While the deliverable-power information may be created based on the power-consumption information, which is created uniformly on the assumable power condition basis, the level of the power to be delivered to the external device may not be set finely or suitably. In other words, the power may not be delivered to the external device efficiently.

The present disclosure is advantageous in that an electronic device, which may deliver power to an external device efficiently, is provided.

According to an aspect of the present disclosure, an electronic device, including a power source, a plurality of power-consuming devices, a USB (Universal Serial Bus) interface, a command receiver, a memory, and a controller, is provided. The power source has a predetermined level of power capacity. The plurality of power-consuming devices are configured to operate by power supplied from the power source. The USB interface is configured to deliver power supplied from the power source to an external device when the external device is connected with the USB interface. The command receiver is configured to receive a command for executing a job. The memory is configured to store values of power consumable in the plurality of power-consuming devices. The controller is configured to, in a case where the command for executing a job is received by the command receiver, forecast at least one of the plurality of power-consuming devices to be used in a time segment, the time segment being one of a plurality of time segments, into which a time length between start and end of the job is divided; calculate a level of total operation power being sum of power required by the forecasted at least one of the plurality of power-consuming devices for the time segment with reference to the values of the power stored in the memory; and determine a level of the power to be delivered to the external device in the time segment based on the level of the total operation power and the level of the power capacity in the power source. The controller is further configured to control the power source to deliver the determined level of the power to the external device through the USB interface during the time segment.

According to another aspect of the present disclosure, an electronic device, including a power source, a plurality of power-consuming devices, a USB (Universal Serial Bus) interface, a command receiver, and a controller, is provided. The power source has a predetermined level of power capacity. The plurality of power-consuming devices are configured to operate by power supplied from the power source. The USB interface is configured to deliver power supplied from the power source to an external device when the external device is connected with the USB interface. The command receiver is configured to receive a command for executing a job. The controller is configured to receive a signal from a power measurer, the signal corresponding to a level of power being output from the power source while the power is being delivered to the external device through the USB interface and detect a value of power being consumed in the external device from the received signal; and in a case where the detected value of the power is a first value, control the power source to restrict the power to be delivered to the external device at a level lower than a level of the power to be delivered to the external device when the detected value of the power is a second value being smaller than the first value.

According to another aspect of the present disclosure, a method to control an electronic device, having a power supply, a plurality of power-consuming devices, a USB (Universal Serial Bus) interface, a command receiver, a memory, and a controller, is provided. The power supplier in the electronic device has a predetermined level of power capacity. The plurality of power-consuming devices in the electronic device are configured to operate by power supplied from the power supplier. The USB interface in the electronic device is configured to deliver power supplied from the power supplier to an external device when the external device is connected with the USB interface. The command receiver in the electronic device is configured to receive a command for executing a job. The memory in the electronic device is configured to store values of power consumable in the plurality of power-consuming devices. The method includes in a case where the command for executing a job is received by the command receiver, forecasting at least one of the plurality of power-consuming devices to be used in a time segment, the time segment being one of a plurality of time segments, into which a time length between start and end of the job is divided; calculating a level of total operation power being sum of power required by the forecasted at least one of the plurality of power-consuming devices for the time segment with reference to the values of the power stored in the memory; and determining a level of the power to be delivered to the external device in the time segment based on the level of the total operation power and the level of the power capacity in the power source. The method further includes controlling the power source to deliver the determined level of the power to the external device through the USB interface during the time segment.

According to another aspect of the present disclosure, a non-transitory computer readable medium storing computer readable instructions that are executable by a computer in an electronic device is provided. The electronic device includes a power source having a predetermined level of power capacity, a plurality of power-consuming devices configured to operate by power supplied from the power source, a USB (Universal Serial Bus) interface configured to deliver power supplied from the power source to an external device when the external device is connected with the USB interface; a command receiver configured to receive a command for executing a job; and a memory configured to store values of power consumable in the plurality of power-consuming devices. The computer readable instructions, when executed by the computer, cause the computer to, in a case where the command for executing a job is received by the command receiver, forecast at least one of the plurality of power-consuming devices to be used in a time segment, the time segment being one of a plurality of time segments, into which a time length between start and end of the job is divided; calculate a level of total operation power being sum of power required by the forecasted at least one of the plurality of power-consuming devices for the time segment with reference to the values of the power stored in the memory; determine a level of the power to be delivered to the external device in the time segment based on the level of the total operation power and the level of the power capacity in the power source; and control the power source to deliver the determined level of the power to the external device through the USB interface during the time segment.

DETAILED DESCRIPTION

Hereinafter, embodiments of the present disclosure will be described with reference to the accompanying drawings.

<Electronic Configuration of MFP>

Figure 1:
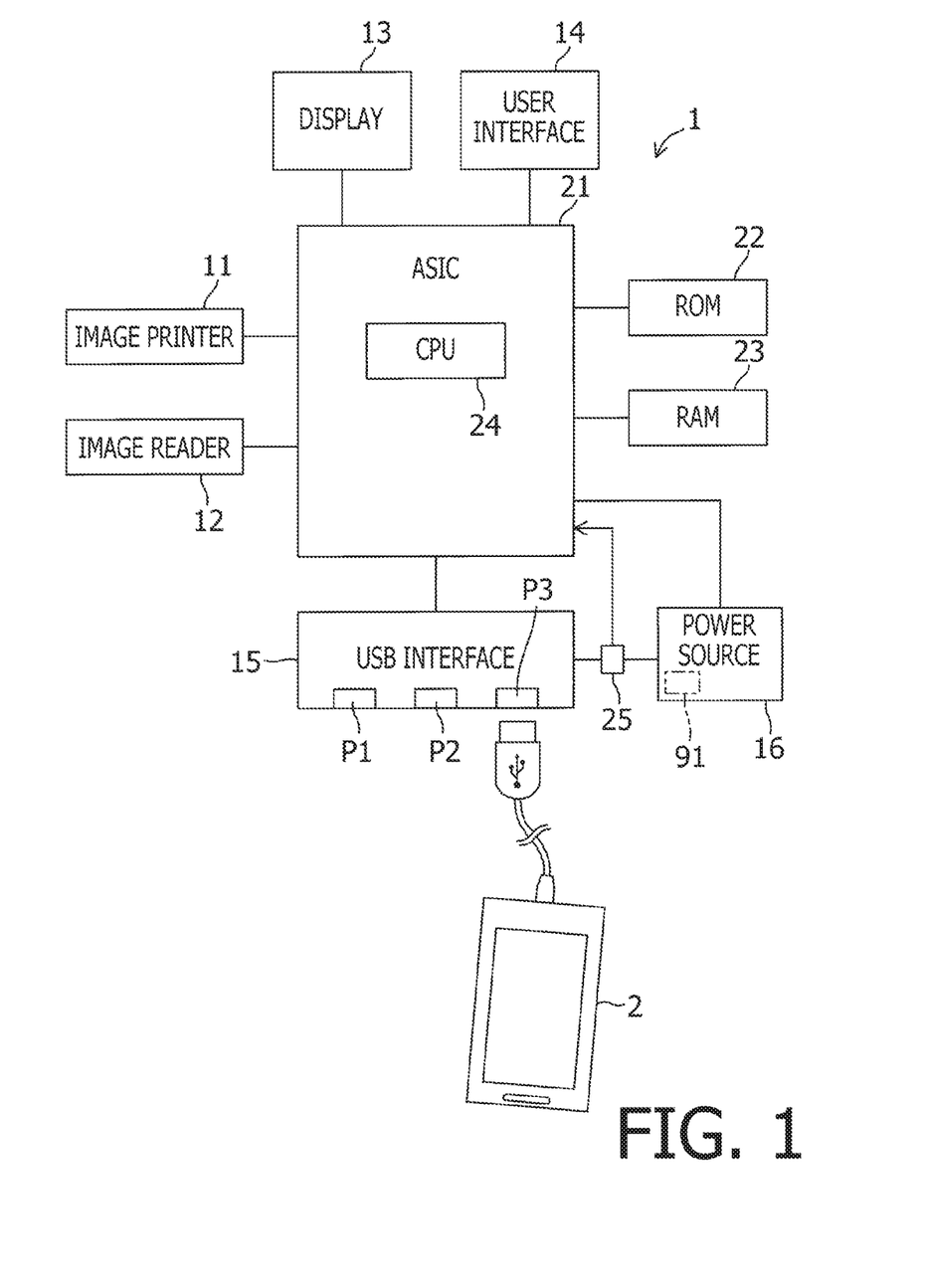
FIG. 1 is a block diagram to illustrate an electrical configuration in an MFP according to embodiments of the present disclosure.

A multifunction peripheral (MFP) 1 being an example of an electronic device includes, as shown in FIG. 1, an image printer 11, an image reader 12, a display 13, a user interface 14, a USB (Universal Serial Bus) interface 15, and a power source 16.

The image printer 11 may form an image concerning image data on a sheet conveyed in a conveying path (not shown) in the MFP 1. The image may be printed in, for example, an electro-photographic method or in an inkjet method, in colors or in monochrome.

The image reader 12 may include an image sensor and an analog front-end (AFE), which are not shown. The image sensor may read an image of a master copy and output analog image signals to the AFE, and the AFE may convert the analog image signals into digital image data.

The display 13 may include, for example, a liquid crystal display. The display 13 may display various types of information.

The user interface 14 may include operation keys, such as a start key, numerical keys, cursor keys, and a return key, which are not shown. A user may operate the operation keys and enter commands or information to the MFP 1 through the user interface 14. Optionally, the user interface 14 may be provided integrally with the display 13.

The USB interface 15 may connect the MFP 1 with an external device 2. The USB interface 15 includes USB ports P1, P2, P3. To each of the USB ports P1, P2, P3, attached may be a USB connector of a USB cable extending from an external device 2 or a USB connector of the external device 2. The USB interface 15 may exchange data with the external device 2 connected thereto through each of the USB ports P1, P2, P3 and deliver power to the external devices 2.

The power source 16 may be connected with a commercial alternate current (AC) power source. The power source 16 may convert power supplied from the commercial AC power source and distribute the converted power to power-consuming devices in the MFP 1 and to the external devices 2 connected to the USB interface 15.

The MFP 1 includes an application specific integrated circuit (ASIC) 21, a ROM 22, and a RAM 23.

The ASIC 21 includes a CPU 24 and is connected with the image reader 12, the user interface 14, the image printer 11, the display 13, the USB interface 15, and the power source 16. Various types of data, including image data generated in the image reader 12 and operation signals indicating operations to the user interface 14, may be input to the ASIC 21. Further, while signals from a current sensor 25 may be input to the AISC 21. The current sensor 25 may detect intensities of currents in the power supplied from the power source 16 through the USB ports P1, P2, P3 to the external devices 2 and transmit value signals indicating the detected intensities of the currents to the ASIC 21.

The CPU 24 may execute programs stored in the ROM 22 and control behaviors of the devices and parts included in the MFP 1 based on signals, including signals input to the ASIC 21. While the CPU 24 executes the controlling programs, the RAM 23 may serve as a work area for the CPU 24. The RAM 23 may include a non-volatile memory (NVRAM).

<Jobs>

The MFP 1 may execute various types of jobs, including a print job associated with the image printer 11 and a scanning job associated with the image reader 12.

The print job may be executed upon entry of a command, for example, when the external device 2, such as a USB memory containing files of printable data, is connected to the USB interface 15 and a user operates the user interface 14 to select one of the files of the printable data to be printed. As the command for the print job is accepted through the user interface 14, the print job may be executed so that the image printer 11 may be manipulated to form an image associated with the selected file of printable data on a sheet.

The scanning job may be executed upon entry of a command, for example, after an original sheet to be scanned is set at a predetermined scanning position in the MFP 1, and when the user operates the user interface 14 to enter the command. As the command for the scanning job is accepted through the user interface 14, the scanning job may be executed so that the image reader 12 may be manipulated to read an image of the original sheet placed at the scanning position and generate image data corresponding to the image having been read.

For another example, the MFP 1 may be connected with an external device such as a personal computer (PC) to communicate through a local area network (LAN), and a file containing printable data and a command for a print job may be transmitted from the external device to the MFP 1. In this regard, the MFP 1 may start executing the print job upon receipt of the data from the external device through a LAN interface (not shown). For another example, after the original sheet to be scanned is placed at the predetermined scanning position in the MFP 1, the user may operate the external device to transmit the command for the scanning job to the MFP 1. The MFP 1 may start executing the scanning job upon receipt of the command through the LAN interface. In other words, the command may be accepted through the LAN interface.

First Embodiment of Power-Delivery Controlling Process

Figure 2:
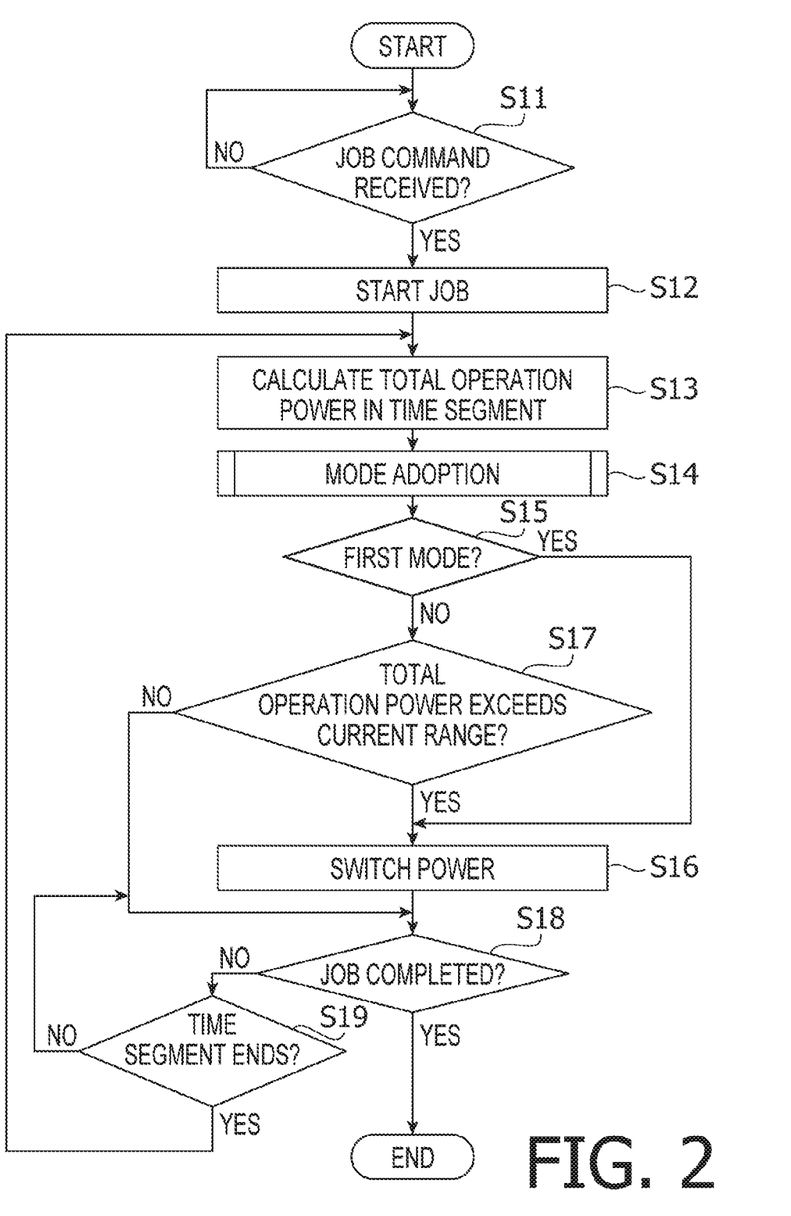
FIG. 2 is a flowchart to illustrate a flow of steps in a power-delivery controlling process to be executed in the MFP according to a first embodiment of the present disclosure.

With reference to FIG. 2, described below will be a power-delivery controlling process to be executed by the CPU 24 to control delivery of the power to the external device 2 through the USB interface 15 while a job is being executed. The power-delivery controlling process may be executed when the MFP 1 is being powered, and while the external device 2 is connected to the USB interface 15.

In S11, the CPU 24 determines whether a command for executing a job is received. If no command for executing a job is received (S11: NO), the CPU 24 repeats S11 until a command for executing a job is received.

If a command for executing a job is received (S11: YES), in S12, the CPU 24 starts the job and proceeds to S13.

In S13, the CPU 24 calculates a level of total operation power required in a predetermined length of time segment between a present moment and the predetermined length later from the present moment. The time segment is one of a plurality of time segments, into which an entire time length between start and end the job is divided. A time segment may start at the present moment in S13 or at a moment later than the present moment and ends the predetermined later from the starting point, i.e., the present moment or the moment later than the present moment. The total operation power is sum of the power required by the power-consuming devices in the MFP 1 which are assumed to be used in the time segment.

The power-consuming devices, e.g., motors (see FIG. 3), to be assumedly used in the job may be determined on a job basis and may vary depending on progressive stages in the job. Some of the power-consuming devices may be assumed to be used in the job depending on an environmental condition at the present moment. For example, a fan (see FIG. 3) may be used depending on a temperature in the MFP 1. In this regard, the power-consuming devices to be used in the time segment in the job may be assumed based on the progressive stage of the job and the environmental condition at the present moment. Meanwhile, levels of the power required by the power-consuming devices may vary depending on conditions of behaviors of the power-consuming devices, and the behaviors of the power-consuming devices may vary depending on the progressive stage of the job and the environmental condition. In this regard, the ROM 22 stores an operation power table (see FIG. 3), in which potential conditions of the power-consuming devices and levels of the power required by the power-consuming devices are associated.

Figure 3:
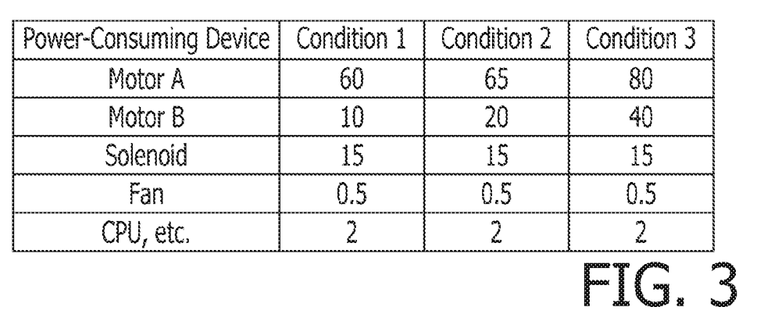
FIG. 3 is an operation power table, in which conditions of power-consuming devices are associated with values of power requirement for the power-consuming devices in the MFP according to the first embodiment of the present disclosure.

In S13, in order to calculate the total operation power required by the power-consuming devices in the predetermined length of time segment, the CPU 24 may first forecast the power-consuming devices to be assumedly used in the time segment between the present moment and the predetermined length later based on the progress of the job and the environmental condition at the present moment. Second, the CPU 24 may refer to the operation power table and read values of the levels of the power required by each of the forecasted power-consuming devices for the condition in the time segment. Third, the CPU 24 may sum the values of the levels of the power read from the operation power table to obtain the total operation power required under the current condition in the time segment.

Following S13, in S14, the CPU 24 executes a mode adopting process to adopt one of modes to deliver the power to the external device 2 through the USB interface 15. The modes to deliver the power to the external device 2 may include a first mode and a second mode. Between the first mode and the second mode, methods to determine a level of the power to be delivered to the external device 2 through the USB interface 15 may be different. The mode adopting process will be described later in detail.

Following S14, in S15, if the first mode is adopted in the mode adopting process (S15: YES), in S16, the CPU 24 switches levels of the power to be delivered to the external device 2. In order to determine the levels of the power to be switched, for example, the CPU 24 may subtract the total operation power required in the time segment, which was calculated in S13, from the power capacity of the power source 16. The CPU 24 may set the difference by the subtraction as a new level of the power to be delivered to the external device 2. The CPU 24 may thereafter switch the levels of the power to the external device 2.

In S15, on the other hand, if the second mode is adopted in the mode adopting process (S15: NO), in S17, the CPU 24 determines whether the total operation power in the time segment between the present moment and the predetermined length later from the present moment exceeds a current power range. For example, the power capacity of the power source 16 may be divided into three (3) power ranges A, B, and C. The power range A may contain power values greater than or equal to zero (0) and smaller than or equal to a first threshold value. The power range B may contain power values greater than the first threshold value and smaller than or equal to a second threshold value. The power range C may contain power values greater than the second threshold value and smaller than or equal to the power capacity of the power source 16. The CPU 24 may determine whether the total operation power in the time segment between the present moment and the predetermined length later from the present moment exceeds either a maximum value or a minimum value in the current power range A, B, or C, to which the current total operation power belongs.

If the total operation power in the time segment between the present moment and the predetermined length later from the present moment exceeds the current power range (S17: YES), in S16, the CPU 24 subtracts the maximum value in the power range A, B, or C, to which the total operation power calculated in S13 belongs, from the power capacity of the power source 16 and sets the difference by the subtraction as a new level of the power to be delivered to the external device 2. The CPU 24 may thereafter switch the level of the power to the external device 2 to the new level of the power.

Meanwhile, if the total operation power stays within the current power range (S17: NO), the level of the power to be delivered to the external device 2 remains unchanged. The CPU 24 proceeds to S18.

In S18, the CPU 24 determines whether the job is completed.

If the job is incomplete (S18: NO), in S19, the CPU 24 determines whether the predetermined length of time since the calculation of the total operation power has elapsed. In other words, the CPU 24 determines whether the time segment started in S13 ended. If the predetermined length of time has not elapsed (S19: NO), the CPU 24 returns to S18 and determines whether job is completed until the predetermined length of time elapses.

If the predetermined length of time since the calculation of the total operation power has elapsed before the job is completed (S19: YES), the CPU 24 returns to S13 and calculates the total operation power in the time segment between the present moment and the predetermined length later from the present moment. The CPU 24 proceeds to S14 and executes steps onward.

When the job is completed (S18: YES), the CPU 24 ends the power-delivery controlling process.

Thus, from the beginning of the job until the end of the job, the total operation power is calculated each time when the predetermined length of time segment ends, and the level of the power to be delivered to the external device 2 through the USB interface 15 may be determined in one of the first mode and the second mode so that the determined level of power may be delivered to the external device 2.

Figure 4:
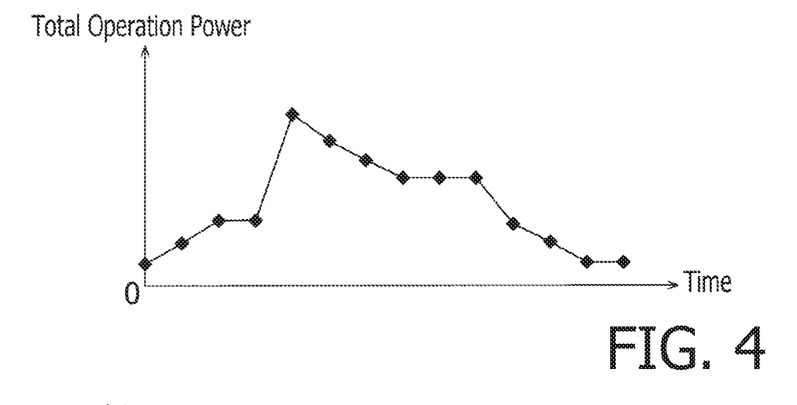
FIG. 4 is a graph to illustrate transition of total operation power during a job in the MFP according to the first embodiment of the present disclosure.
Figure 5:
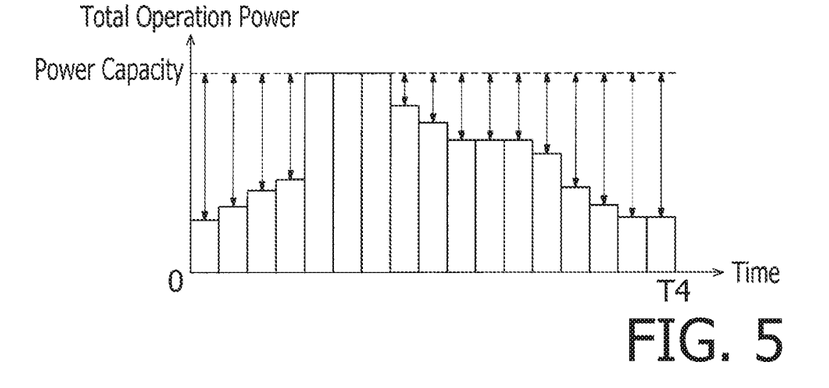
FIG. 5 is a graph to illustrate a first mode in the MFP according to the first embodiment of the present disclosure.

For example, the total operation power in an entire time length while the job is being executed may fluctuate in a way shown in FIG. 4. In this regard, as shown in FIG. 5, in the first mode, the entire time length 0-T4 for the job may be divided into a plurality of time segments, each of which has the same predetermined length, and each time a starting point of a new time segment arrives, in other words, at the predetermined length of interval, the level of the power to be delivered through the USB interface 15 to the external device 2 may be updated and switched to the updated level.

Figure 6:
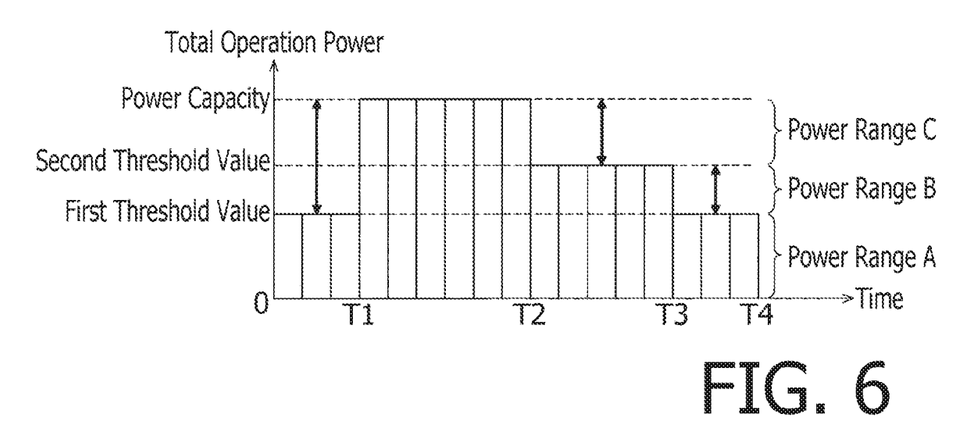
FIG. 6 is a graph to illustrate a second mode in the MFP according to the first embodiment of the present disclosure.

Meanwhile, as shown in FIG. 6, in the second mode, in a time length 0-T1 containing a plurality of time segments, the total operation power calculated in each time segment falls in the power range A, which contains power values smaller than or equal to the first threshold value. Therefore, throughout the time length 0-T1, the level of the power to be delivered to the external device 2 through the USB interface 15 is maintained unchanged. At time T1, the total operation power exceeds the power range A and falls in the power range C. Therefore, the power to be delivered to the external device 2 through the USB interface 15 is switched to a level corresponding to the power range C. In a time length T1-T2 containing a plurality of time segments, the total operation power calculated in each time segment falls in the power range C. Therefore, throughout the time length T1-T2, the level of power to be delivered to the external device 2 through the USB interface 15 is maintained unchanged. At time T2, the total operation power does not reach the power range C but falls in the power range B. Therefore, the power to be delivered to the external device 2 through the USB interface 15 is switched to a level corresponding to the power range B. In a time length T2-T3 containing a plurality of time segments, the total operation power calculated in each time segment falls in the power range B. Therefore, throughout the time length T2-T3, the level of the power to be delivered to the external device 2 through the USB interface 15 is maintained unchanged. At time T3, the total operation power does not reach the power range C but falls in the power range A. Therefore, the level of the power to be delivered to the external device 2 through the USB interface 15 is switched to the level corresponding to the power range A. In a time length T3-T4 containing a plurality of time segments, the total operation power calculated in each time segment falls in the power range B. Therefore, throughout the time length T3-T4, the level of the power to be delivered to the external device 2 through the USB interface 15 is maintained unchanged.

<Mode Adopting Process>

Figure 7:
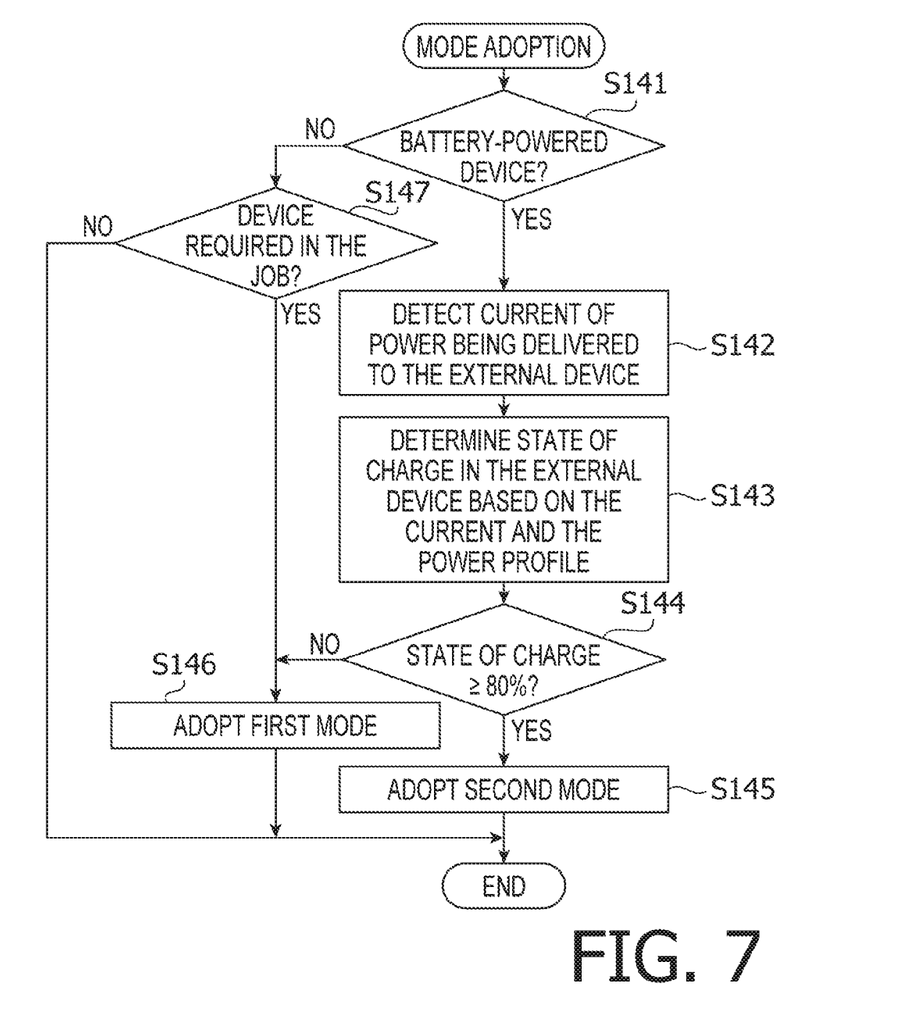
FIG. 7 is a flowchart to illustrate a flow of steps in a mode adopting process to be executed in the MFP according to the first embodiment of the present disclosure.

In the mode adopting process, as shown in FIG. 7, in S141, the CPU 24 determines whether the external device 2 connected to the USB interface 15 is a battery-powered device. A battery-powered device is equipped with a battery and may be driven by power supplied by the battery.

If the external device 2 is a battery-powered device (S141: YES), in S142, the CPU 24 detects a value of a current in the power being delivered through the USB interface 15 to the external device 2 based on the detection signals from the current sensor 25.

In S143, the CPU 24 refers to a power profile, which may be stored in the ROM 22 or the non-volatile memory in the RAM 23 in association with information identifying the external device 2, and determines state of charge in the battery in the external device 2 based on the value of the current in the power being delivered to the external device 2.

Figure 8:
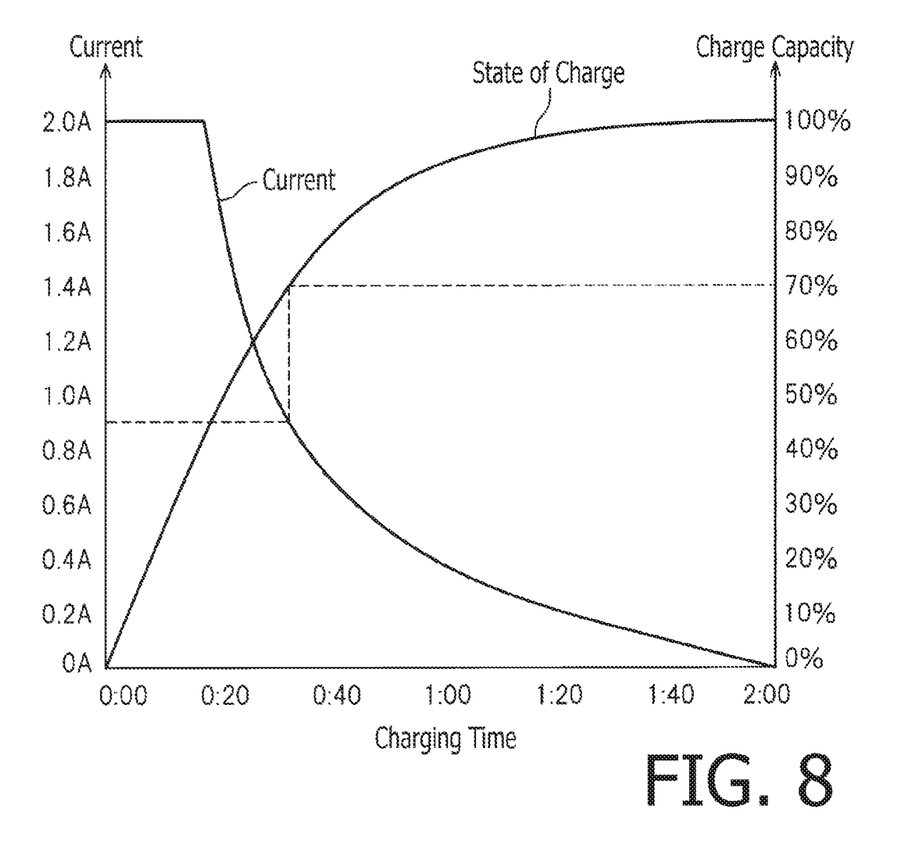
FIG. 8 illustrates a power profile in the MFP according to the first embodiment of the present disclosure.

An example of the power profile is shown in FIG. 8. The power profile in FIG. 8 illustrates transition of a current flowing in the external device 2, having a battery with charge capacity of 4000 mAh, while power is being delivered to the external device 2, and transition of state of charge in the battery as the battery is being charged simultaneously, along the time within a time period between a point of delivery start, at which delivery of power to the external device 2 through the USB interface 15 starts, and a point of charge completion, at which the battery in the external device 2 is fully charged. For example, while the power source 16 is controlled to deliver the current of 2.0 A to the external device 2, if the intensity value of the current in the signals from the current sensor 25 indicates 0.9 A, the power profile shows that the state of charge in the battery in the external device 2 is 70%.

Following S143, in S144, the CPU 24 determines whether the state of charge in the battery in the external device 2 is higher than or equal to 80%.

If the state of charge in the battery is higher than or equal to 80% (S144: YES), in S145, the CPU 24 adopts the second mode as the mode to deliver power to the external device 2 through the USB interface 15. Thereafter, the CPU 24 ends the mode adopting process.

In S144, on the other hand, if the state of charge in the battery in the external device 2 is lower than 80% (S144: NO), in S146, the CPU 24 adopts the first mode as the mode to deliver power to the external device through the USB interface 15. Thereafter, the CPU 24 ends the mode adopting process.

Meanwhile, in S141, if the external device 2 connected to the USB interface 15 is not a battery-powered device (S141: NO), in S147, the CPU 24 determines if the external device 2 is required in the job. For example, the external device 2 connected to the USB interface 15 may be a USB memory containing a file of printable data. If the MFP 1 executes a print job to form an image of the printable data in the file contained in the connected external device 2, the external device 2 connected to the USB interface 15 may be determined to be a device required in the job.

In S147, if the external device 2 is a device required in the job (S147: YES), in S146, the CPU 24 adopts the first mode as the mode, in which the power is to be delivered to the external device 2 through the USB interface 15. Thereafter, the CPU 24 ends the mode adopting process.

In S147, on the other hand, if the external device 2 connected to the USB interface 15 is neither a device required in the job nor a battery-powered device (S147: NO), the external device 2 may not necessarily be powered. Therefore, the CPU 24 adopts neither of the first mode nor the second mode and ends the mode adopting process.

<Benefits>

As described above, when a command to execute a job is entered, power required by the power-consuming devices to be used in a time segment is summed to obtain the total operation power. Based on the total operation power and the power capacity of the power source 16, the power to be delivered to the external device 2 is determined. Therefore, compared to a method, by which a level of the power to be delivered to the external device 2 may be determined based on a level of the power uniformly preset to a job, the level of the power to be delivered to the external device 2 may be suitably changed, and the power may be delivered to the external device 2 efficiently.

The mode to deliver the power to the external device 2 through the USB interface 15 may include the first mode and the second mode.

In the first mode, the level of the power to be delivered to the external device 2 through the USB interface 15 may be determined on or before when a starting point of a time segment arrives, in other words, the level of the power to be delivered to the external device 2 through the USB interface 15 may be determined at the time when the starting point of the time segment arrives at the latest, so that the level of the power to be delivered to the external device 2 through the USB interface 15 may be switched each time when a starting point of a time segment arrives.

In the second mode, the total operation power may be calculated on or before when a starting point of a time segment arrives; however, the level of the power to be delivered to the external device 2 may be determined only when the total operation power exits one power range and enters another power range, and the level of the power to be delivered to the external device 2 through the USB interface 15 may be switched to the newly determined level of the power at the starting point of the time segment.

In this regard, in the first mode, the level of the power to be delivered to the external device 2 through the USB interface 15 may be changed more finely compared to the second mode, and the power may be delivered to the external device 2 more efficiently. On the other hand, in the second mode, frequency of computations to determine the level of the power to be delivered to the external device 2 through the USB interface 15 may be reduced, compared to the first mode, so that workload on the CPU 24 may be reduced.

The mode to be adopted may be determined between the first mode and the second mode depending on the state of charge in the battery in the external device 2. When the state of charge in the battery in the second external device 2 is higher than or equal to 80%, the second mode may be adopted; and when the state of charge in the battery in the second external device 2 is lower than 80%, the first mode may be adopted. In this way, when the state of charge in the battery is lower, the level of the power to be charged in the battery in the external device 2 may be increased as high as possible so that the battery may be charged in shorter time.

Even when the external device 2 connected to the USB interface 15 is not a battery-powered device, as long as the external device is required in the job, the first mode may be adopted. Thus, the external device 2 may be powered so that the job may be conducted without failure, which may be caused by insufficient power.

Second Embodiment

Figure 9:
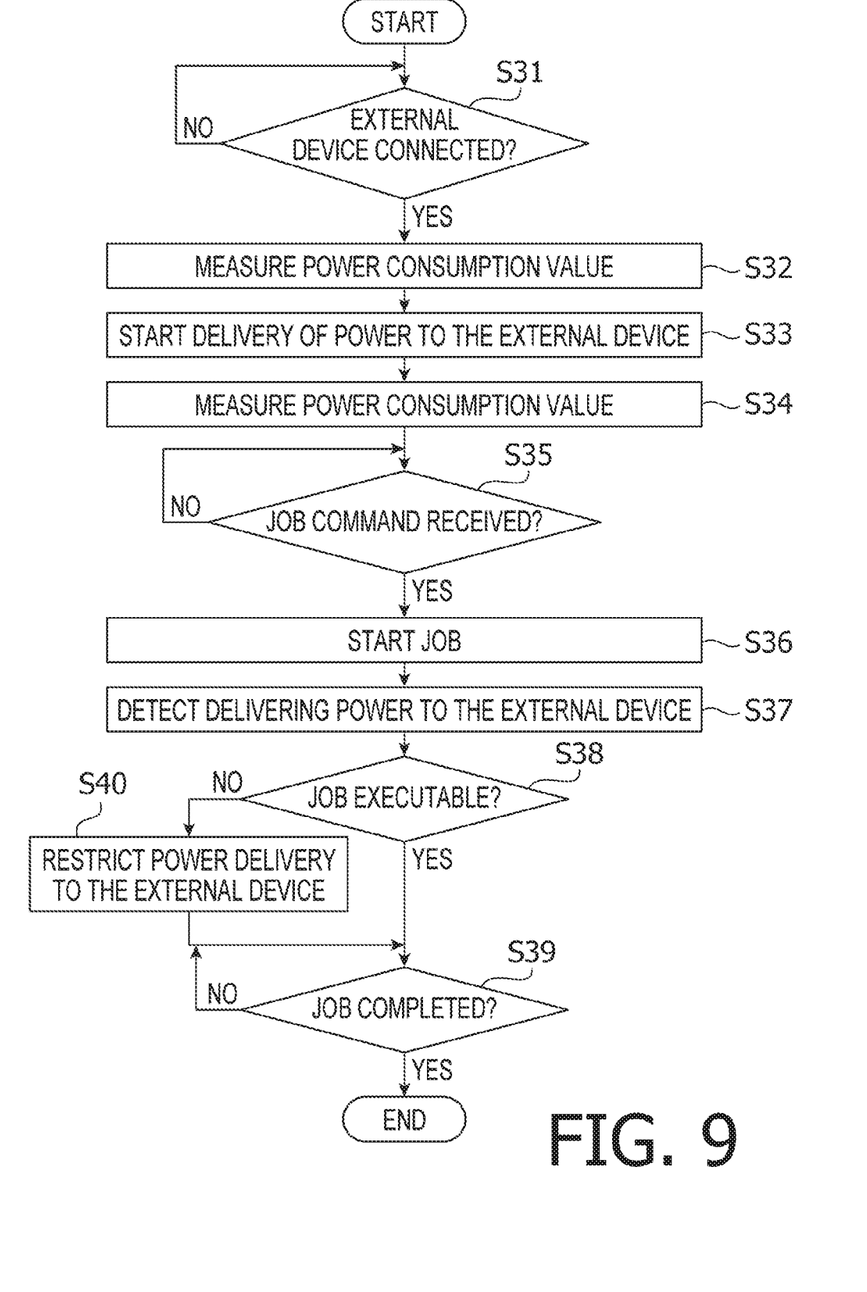
FIG. 9 is a flowchart to illustrate a flow of steps in a power-delivery controlling process to be executed in the MFP according to a second embodiment of the present disclosure.

The power-delivery controlling process shown in FIG. 2 may be replaced by another power-delivery controlling process shown in FIG. 9.

According to the power-delivery controlling process in the second embodiment, as shown in FIG. 9, in S31, the CPU 24 determines whether an external device 2 is connected to the USB interface 15. The CPU 24 repeats S31 until an external device 2 is connected to the USB interface 15 (S31: NO). If an external device 2 is connected to the USB interface 15 (S31: YES), the CPU 24 proceeds to S32.

In S32, the CPU 24 measures a value of power consumption in the MFP 1 i.e., a level of power output from the power source 16, under a condition where no power is delivered to the external device 2 though the USB interface 15. The value of the power consumption in the MFP 1 may be measured by, for example, a power-measuring IC 91 (see FIG. 1), provided in the power source 16.

Following S32, in S33, the CPU 24 starts delivering power to the external device 2 connected to the USB interface 15.

In S34, the CPU 24 measures the value of power consumption in the MFP 1, including power consumption in the connected external device 2.

In S35, the CPU 24 determines whether a command for executing a job is received. If no command for executing a job is received (S35: NO), the CPU 24 repeats S35 until a command for executing a job is received. If a command for executing a job is received (S35: YES), the CPU 24 proceeds to S36.

In S36, the CPU 24 starts the job and proceeds to S37.

In S37, the CPU 24 detects a level of the power being delivered to the external device 2 through the USB interface 15. The CPU 24 may detect the value of the power being delivered to the external device 2 through the USB interface 15 by subtracting the value of power consumption under the condition where no power is delivered to the external device 2 though the USB interface 15, which is measured in S32, from the value of power consumption measured after starting the power delivery to the external device 2 connected to the USB interface 15, which is measured in S34.

In S38, the CPU 24 determines, based on the power capacity of the power source 16 and the power being delivered to the external device 2, whether job is executable. If subtraction of the power being delivered to the external device 2 from the power capacity of the power source 16 results a remainder that exceeds a level of the power required to execute the job, the job is executable (S38: YES). The CPU 24 proceeds to S39.

In S39, the CPU 24 continues executing the job (S39). When the job is completed (S39: YES), the CPU 24 ends the power-delivery controlling process.

In S38, if the job is not executable, in other words, the subtraction of the power being delivered to the external device 2 from the power capacity of the power source 16 results a remainder that is lower than a level of the power required to execute the job, the job is not executable (S38: NO). The CPU 24 proceeds to S40.

In S40, the CPU 24 restricts the power to be delivered to the external device 2 so that the power required in the job may be secured. The CPU 24 proceeds to S39.

In S39, the CPU 24 continues executing the job (S39). When the job is completed (S39: YES), the CPU 24 ends the power-delivery controlling process.

<Benefits>

According to the second embodiment, the value of power consumption measured under the condition where no power is being delivered to the external device 2 through the USB interface 15 is subtracted from value of power consumption measured under the condition where the power is being delivered to the external device 2 connected to the USB interface 15. The remainder of the subtraction indicates the value of the power being delivered to the external device 2 through the USB interface 15. Thus, the value of the power being actually consumed in the external device 2 connected to the USB interface 15 may be detected.

Figure 10:
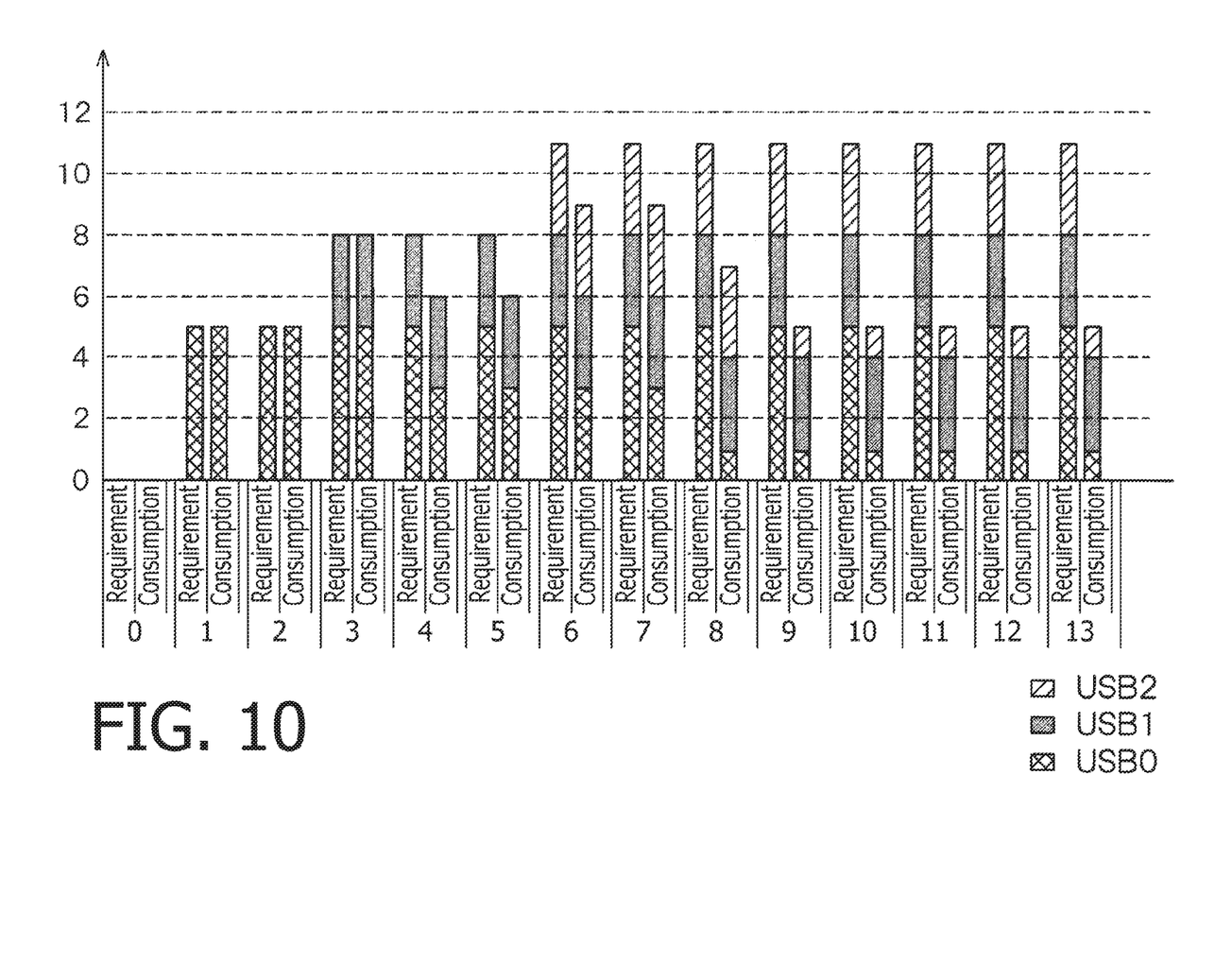
FIG. 10 is a graph to illustrate transition of power required by an external device and power consumed by the external device connected with the MFP according to the second embodiment of the present disclosure.

As shown in FIG. 10, while the power is being delivered to the external device 2 through the USB interface 15, a value of the power required by the external device 2, i.e., a maximum value of the power to be consumed in the external device 2, may not always match the value of the power actually consumed in the external device 2. In some cases, a value of the power being actually consumed in the external device 2 may be lower than a value of the power required by the external device 2.

In this regard, if the determination, whether the job is executable, is made based on a remainder, which is a result of subtracting the power required by the external device 2 from the power capacity of the power source 16, the power to be delivered to the external device 2 may be unnecessarily restricted when the power being actually consumed in the external device 2 is lower and the job is actually executable.

For example, a value of power capacity of the power source may be "20," and a value of the power required in the job may be "14." A command to execute the job may be entered in a time segment "9" (see FIG. 10), in which a value of the power required by the external device 2 may be "11." A remainder of subtracting the power requirement value "11" from the power capacity value "20" may be "9." In this regard, the CPU 24 may determine that the job is not executable. Therefore, in order to secure the power required in the job, the CPU 24 may restrict the power to be delivered to the external device 2.

However, a value of the power to be actually consumed in the external device 2 may be "5." Therefore, an actual remainder of subtracting the power requirement value "5" from the power capacity value "20" may be "15." In other words, the job is executable. Thus, according to the method described in the second embodiment, that whether the job is executable is determined based on the result "15" of subtracting the power consumption value "5" from the power capacity value "20," the job may be executable without restricting the power to be delivered to the external device 2.

For another example, in time segment "8," a value of the power being actually consumed in the external device 2 may be "7," which is greater than a difference "6" between the power capacity value "20" of the power source 16 and the power requirement value "14" for the job. Meanwhile, in time segment "9," a value of the power being actually consumed in the external device 2 may be "5," which is smaller than a difference "6" between the power capacity value "20" of the power source 16 and the power requirement value "14" for the job. Therefore, in time segment "8," the power to be delivered to the external device 2 may be restricted so that the power to execute the job may be secured, while in time segment "9" the power to be delivered to the external device 2 may not be restricted.

Thus, depending on the power to be actually consumed in the external device 2, the power required to execute the job may be secured, and the power may be delivered to the external device 2 efficiently.

In FIG. 10, labels "USB0," "USB1," and "USB2" in the legend represent the USB ports P1, P2, and P3 (see FIG. 1), to which the external devices 2 may be connected, respectively.

More Examples

Although examples of carrying out the invention have been described, those skilled in the art will appreciate that there are numerous variations and permutations of the electronic device that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the level of the power being delivered to the external device 2 through the USB interface 15 may not necessarily be obtained by subtracting the level of power consumption under the condition where no power is delivered to the external device 2 though the USB interface 15 from the level of power consumption measured after starting the power delivery to the external device 2 connected to the USB interface 15, as illustrated in the second embodiment. For example, the external device 2 may have a circuit to measure the level of the power being delivered to the external device 2 through the USB interface 15 and may provide a measured value of the power being delivered through the USB interface 15 to the CPU 24. The CPU 24 receiving the measured value of the power from the external device 2 and determine the level of the power being delivered to the external device 2 through the USB interface 15.

For another example, the level of power consumption in the external device 2 may not necessarily be measured under the condition where no power is being delivered to the external device 2 through the USB interface 15 but may be measured under a condition where no external device 2 is yet connected to the USB interface 15.

For another example, the present disclosure may not necessarily be embodied in the MFP 1 as described above but may be embodied in a single-functioned electronic device such as, for example, a printer having an image forming function to form an image on a sheet, and a scanner having an image reading function to read an image of a master copy, or in an electronic device having an interface that may deliver power to a plurality of external devices.

What is claimed is:

1. An electronic device, comprising:
   a power source having a predetermined level of power capacity;
   a plurality of power-consuming devices configured to operate by power supplied from the power source;
   a USB (Universal Serial Bus) interface configured to deliver power supplied from the power source to an external device when the external device is connected with the USB interface;
   a printer configured to form an image on a sheet;
   an image reader configured to read an image;
   a command receiver configured to receive a command for executing a job;
   a memory configured to store values of power consumable in the plurality of power-consuming devices; and
   a controller configured to:
      in a case where the command for executing a job is received by the command receiver, the job being at least one of a print job, in which the controller is configured to control the printer to form the image on the sheet, and a scanning job, in which the controller is configured to control the image reader to read the image, forecast at least one of the plurality of power-consuming devices to be used in a time segment, the time segment being one of a plurality of time segments, into which a time length from start to end of the job is divided;
      calculate a level of total operation power being a sum of power required by the forecasted at least one of the plurality of power-consuming devices for the time segment with reference to the values of power stored in the memory and current progress of the job, the total operation power fluctuating among the time segments over the time length of the job; and
      determine a level of the power to be delivered to the external device in the time segment based on the level of the total operation power and the level of the power capacity in the power source; and
   control the power source to deliver the determined level of the power to the external device through the USB interface during the time segment.

2. The electronic device according to claim 1,
   wherein the controller is configured to determine the level of the power to be delivered to the external device for each one of the plurality of time segments when, at the latest, a starting point of each one of the plurality of time segments arrives; and
   wherein the controller is configured to control the power source to deliver the determined level of the power to the external device each time when the starting point of each one of the plurality of time segments arrives.

3. The electronic device according to claim 2,
   wherein, in a case where the external device connected to the USB interface has a battery with state of charge being lower than a predetermined level, the controller is configured to control the power source to deliver the determined level of the power to the external device by a first mode where the level of the power to be delivered to the external device in the time segment is updated each time when the starting point of each one of the plurality of time segments arrives; and
   wherein, in a case where the external device connected to the USB interface has a battery with state of charge being higher than or equal to the predetermined level, the controller is configured to control the power source to deliver the determined level of the power to the external device by a second mode being different from the first mode.

4. The electronic device according to claim 3, further comprising:
   a current detector configured to detect a current in the power being delivered to the external device through the USB interface,
   wherein the memory is configured to further store a profile, the profile associating the current detected by the current detector within a time period between a point of delivery start, at which delivery of the power to the external device through the USB interface starts, and a point of charge completion, at which the battery in the external device is fully charged, with information identifying the external device; and
   wherein the controller is configured to determine the state of charge in the battery in the external device with reference to the profile stored in the memory and based on a value of the current detected by the current detector after the point of delivery start.

5. The electronic device according to claim 3,
   wherein the second mode is configured to update the level of the power to be delivered to the external device in the time segment at the starting point of the time segment in a case where the level of the total operation power in the time segment exceeds a threshold level.

6. The electronic device according to claim 2,
   wherein in a case where the external device connected to the USB interface is a first-typed external device, the controller is configured to control the power source to deliver the determined level of the power to the first-typed external device by a first mode where the level of the power to be delivered to the first-typed external device in the time segment is updated each time when the starting point of each one of the plurality of time segments arrives; and
   wherein, in a case where the external device connected to the USB interface is a second-typed external device, the controller is configured to control the power source to deliver the determined level of the power to the external device by a second mode different from the first mode.

7. The electronic device according to claim 6,
   wherein the second mode is configured to update the level of the power to be delivered to the second-typed external device in the time segment at the starting point of the time segment in a case where the level of the total operation power in the time segment exceeds a threshold level.

8. The electronic device according to claim 1, wherein the controller is configured to forecast the at least one of the plurality of power-consuming devices to be used in the time segment based on an environmental condition.

9. An electronic device, comprising:
a power source having a predetermined level of power capacity;
a plurality of power-consuming devices configured to operate by power supplied from the power source;
a USB (Universal Serial Bus) interface configured to deliver power supplied from the power source to an external device when the external device is connected with the USB interface;
a printer configured to form an image on a sheet;
an image reader configured to read an image;
a command receiver configured to receive a command for executing a job; and
a controller configured to:
  receive a signal from a power measurer, the signal corresponding to a level of power being output from the power source within a time segment in which the command is received, the time segment being one of a plurality of time segments, into which a time length from start to end of the job is divided, the job being at least one of a print job, in which the controller is configured to control the printer to form the image on the sheet, and a scanning job, in which the controller is configured to control the image reader to read the image, while the power is being delivered to the external device through the USB interface and detect a value of power being consumed in the external device from the received signal within the time segment; and
  in a case where the detected value of the power is a first value, control the power source to restrict the power to be delivered to the external device to a greater extent than the power to be delivered to the external device is restricted when the detected value of the power is a second value smaller than the first value.

10. The electronic device according to claim 9, wherein the electronic device comprises the power measurer;
wherein the controller is configured to control the power measurer to obtain a first measurement value by measuring the level of the power being output from the power source while the power is being delivered to the external device through the USB interface and a second measurement value by measuring a level of the power being output from the power source while no power is being delivered to the external device through the USB interface; and
wherein the controller is configured to detect the value of the power being consumed in the external device by subtracting the second measurement value from the first measurement value.

11. The electronic device according to claim 10, wherein the controller is configured to control the power measurer to obtain the second measurement value by measuring the level of the power being output from the power source while the external device is connected to the USB interface but no power is being delivered to the external device through the USB interface.

12. The electronic device according to claim 10, wherein, in a case where the command receiver receives the command for executing the job, the controller is configured to determine a level of the power to be delivered to the external device based on a value of power being consumed in the job and the predetermined level of the power capacity in the power source.

13. The electronic device according to claim 9, wherein the first value is a value greater than a difference between a value of the power capacity and a value of power required for the job.

14. A method to control an electronic device comprising a power source having a predetermined level of power capacity; a plurality of power-consuming devices configured to operate by power supplied from the power source; a USB (Universal Serial Bus) interface configured to deliver power supplied from the power source to an external device when the external device is connected with the USB interface; a printer configured to form an image on a sheet; an image reader configured to read an image; a command receiver configured to receive a command for executing a job; a memory configured to store values of power consumable in the plurality of power-consuming devices; and a controller, the method comprising:
  in a case where the command for executing a job is received by the command receiver, the job being at least one of a print job, in which the controller is configured to control the printer to form the image on the sheet, and a scanning job, in which the controller is configured to control the image reader to read the image, forecasting at least one of the plurality of power-consuming devices to be used in a time segment, the time segment being one of a plurality of time segments, into which a time length from start to end of the job is divided; calculating a level of total operation power being a sum of power required by the forecasted at least one of the plurality of power-consuming devices for the time segment with reference to the values of power stored in the memory and current progress of the job, the total operation power fluctuating among the time segments over the time length of the job; and determining a level of the power to be delivered to the external device in the time segment based on the level of the total operation power and the level of the power capacity in the power source; and
  controlling the power source to deliver the determined level of the power to the external device through the USB interface during the time segment.

15. The method according to claim 14, wherein the level of the power to be delivered to the external device for each one of the plurality of time segments is configured to be determined when, at the latest, a starting point of each one of the plurality of time segments arrives; and
wherein the power source is configured to be controlled to deliver the determined level of the power to the external device each time when the starting point of each one of the plurality of time segments arrives.

16. The method according to claim 15, wherein, in a case where the external device connected to the USB interface has a battery with state of charge being lower than a predetermined level, the power source is configured to be controlled to deliver the determined level of the power to the external device by a first mode where the level of the power to be delivered to the external device in the time segment is updated each time when the starting point of each one of the plurality of time segments arrives; and wherein, in a case where the external device connected to the USB interface has a battery with state of charge being higher than or equal to the predetermined level, the power source is configured to be controlled to deliver the determined level of the power to the external device by a second mode different from the first mode.

17. The method according to claim 16, wherein the electronic device comprises a current detector configured to detect a current in the power being delivered to the external device through the USB interface;

wherein the memory in the electronic device is configured to further store a profile, the profile associating the current detectable by the current detector within a time period between a point of delivery start, at which delivery of the power to the external device through the USB interface starts, and a point of charge completion, at which the battery in the external device is fully charged, with information identifying the external device; and wherein the state of charge in the battery in the external device is configured to be determined with reference to the profile stored in the memory and based on a value of the current detected by the current detector after the point of delivery start.

18. The method according to claim 16, wherein the second mode is configured to update the level of the power to be delivered to the external device in the time segment at the starting point of the time segment in a case where the level of the total operation power in the time segment exceeds a threshold level.

19. The method according to claim 15, wherein in a case where the external device connected to the USB interface is a first-typed external device, the power source is configured to be controlled to deliver the determined level of the power to the first-typed external device by a first mode, in which the level of the power to be delivered to the first-typed external device in the time segment is updated each time when the starting point of each one of the plurality of time segments arrives; and wherein, in a case where the external device connected to the USB interface is a second-typed external device, the power source is configured to be controlled to deliver the determined level of the power to the external device by a second mode different from the first mode.

20. The method according to claim 19, wherein the second mode is configured to update the level of the power to be delivered to the second-typed external device in the time segment at the starting point of the time segment in a case where the level of the total operation power in the time segment exceeds a threshold level.

21. The method according to claim 14, wherein the at least one of the plurality of power-consuming devices to be used in the time segment is configured to be forecasted based on an environmental condition.

22. A non-transitory computer readable medium storing computer readable instructions that are executable by a computer in an electronic device comprising a power source having a predetermined level of power capacity; a plurality of power-consuming devices configured to operate by power supplied from the power source; a USB (Universal Serial Bus) interface configured to deliver power supplied from the power source to an external device when the external device is connected with the USB interface; a printer configured to form an image on a sheet; an image reader configured to read an image; a command receiver configured to receive a command for executing a job; and a memory configured to store values of power consumable in the plurality of power-consuming devices, the computer readable instructions, when executed by the computer, causing the computer to:

in a case where the command for executing a job is received by the command receiver, the job being at least one of a print job, in which the computer is configured to control the printer to form the image on the sheet, and a scanning job, in which the computer is configured to control the image reader to read the image, forecast at least one of the plurality of power-consuming devices to be used in a time segment, the time segment being one of a plurality of time segments, into which a time length from start to end of the job is divided; calculate a level of total operation power being sum of power required by the forecasted at least one of the plurality of power-consuming devices for the time segment with reference to the values of power stored in the memory and current progress of the job, the total operation power fluctuating among the time segments over the time length of the job; and determine a level of the power to be delivered to the external device in the time segment based on the level of the total operation power and the level of the power capacity in the power source; and control the power source to deliver the determined level of the power to the external device through the USB interface during the time segment.

* * * * *

UNITED STATES PATENT AND TRADEMARK OFFICE
CERTIFICATE OF CORRECTION

PATENT NO. : 10,948,961 B2  
APPLICATION NO. : 15/939453  
DATED : March 16, 2021  
INVENTOR(S) : Katsunori Sakai et al.

Page 1 of 1

It is certified that error appears in the above-identified patent and that said Letters Patent is hereby corrected as shown below:

On the Title Page

Item (57), in the Abstract, Line 9:
Please delete "determine" and insert --determines--

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*